April 22, 1924.

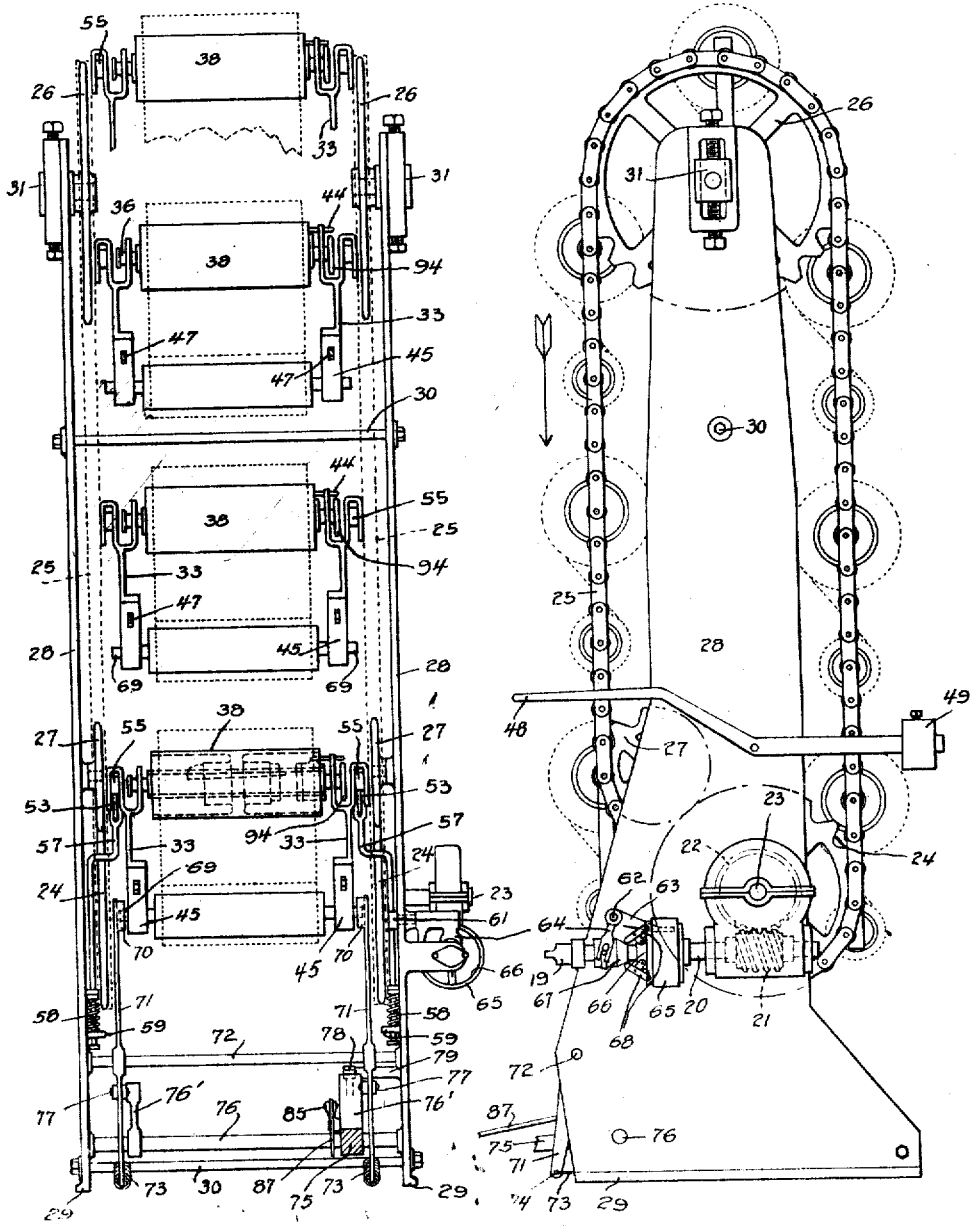

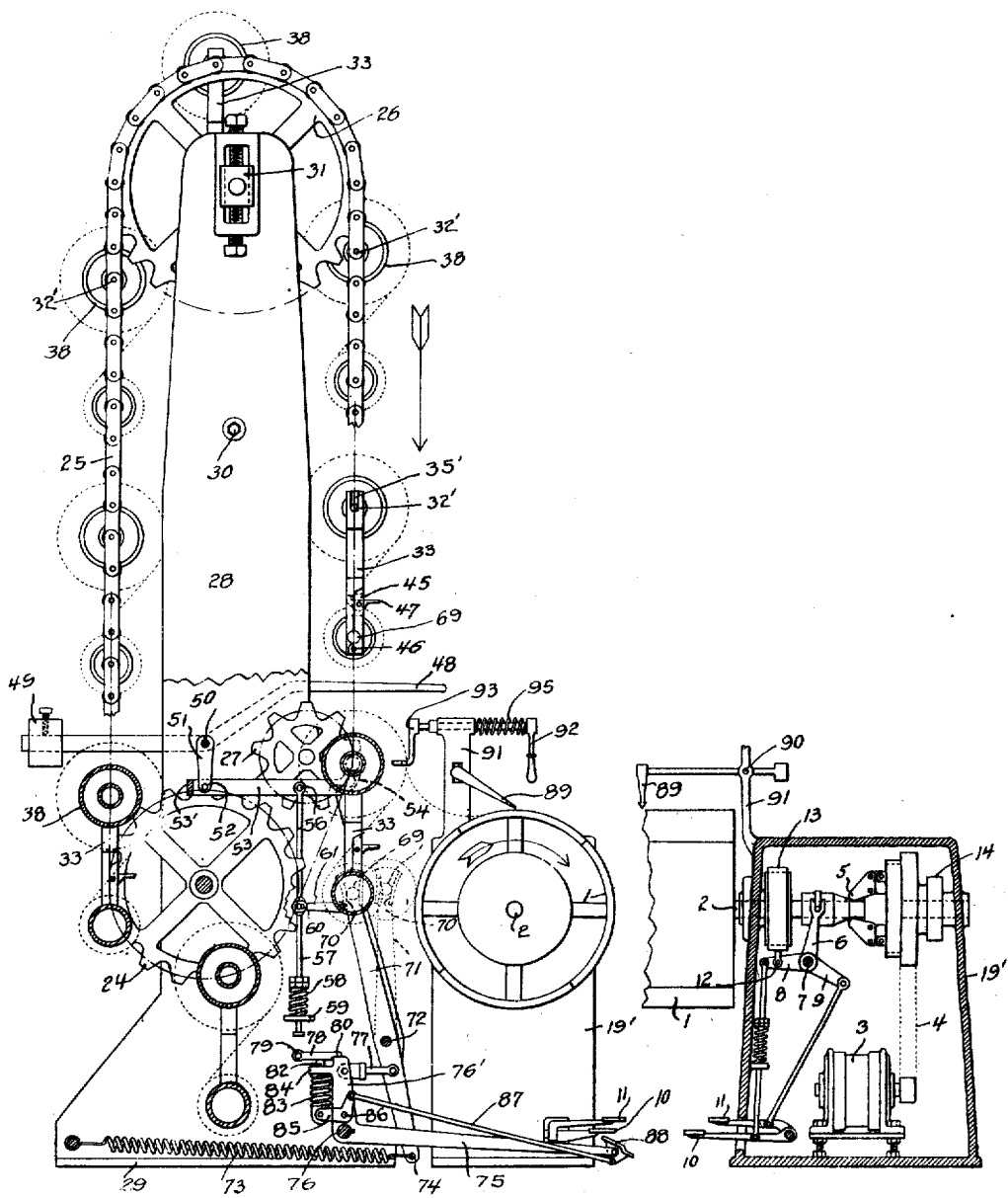

A. O. ABBOTT, JR., ET AL 1,491,282

APPARATUS FOR SUPPLYING STOCK TO TIRE BUILDERS

Filed Jan. 13, 1921   3 Sheets-Sheet 3

INVENTORS,
Adrian O. Abbott Jr. and
Clyde J. Smith.
BY Ernest Hopkinson
THEIR ATTORNEY.

Patented Apr. 22, 1924.

1,491,282

UNITED STATES PATENT OFFICE.

ADRIAN O. ABBOTT, JR., AND CLYDE J. SMITH, OF DETROIT, MICHIGAN, ASSIGNORS TO MORGAN & WRIGHT, A CORPORATION OF MICHIGAN.

APPARATUS FOR SUPPLYING STOCK TO TIRE BUILDERS.

Application filed January 13, 1921. Serial No. 436,949.

*To all whom it may concern:*

Be it known that we, ADRIAN O. ABBOTT, Jr., and CLYDE J. SMITH, both citizens of the United States, and residents of Detroit, county of Wayne, State of Michigan, and Detroit, county of Wayne, and State of Michigan, respectively, have invented certain new and useful Improvements in Apparatus for Supplying Stock to Tire Builders, of which the following is a full, clear, and exact description.

This invention relates to the building of tires, and more particularly to apparatus for supplying rubberized fabric, woven or cord, to tire builders.

Tires are ordinarily built upon carcass formers, either cores whose cross sections conform to the interior of the tire, or collapsible drums of substantially cylindrical form. The tire builder stands in front of the carcass former, and plies up one sheet of fabric after another, in the case of cord tires disposing the cords of alternate layers at an angle to one another. The present invention is designed especially to supply stock for building tires on collapsible drums, but in its broad aspects comprehends supplying stock to the core type of carcass former as well as the drum type.

Over prior stock magazines the present invention seeks to improve by economizing floor space with a vertical as distinguished from a horizontal or circular arrangement of sets of rolls; by relieving the operative of attention in bringing the new set of rolls within convenient reach, a starting member only having to be operated manually to successively present the stock roll units; by relieving the operative of care in handling the stock with a "stock feed" substantially equal to the peripheral velocity of the carcass at all times, substantially free of distortion or tension, and central to the work; by preventing interruption of the operative with an accessible arrangement for replenishing stock rolls; by relieving the operative of personally preventing "coasting" of the rolls; and by economy of power with connections for driving the stock roll magazine from the same unit or source of power as the carcass former. These are advantages of the improved construction, and other advantages thereof will appear later in the detailed description of the construction.

With the embodiment of the invention illustrated in the drawings in mind, and without intention to limit the scope of the invention beyond the extent required by the prior art, the apparatus comprises endless chains between which depending hangers carrying supply and liner rolls are free to swing and maintain themselves in a vertical position. A substantially vertical flight of the chains is provided at a point immediately in rear of the carcass former. A clutch is provided in the drive for the chain, and associated with the clutch operating mechanism is a stop or trip that cooperates successively with the chain or rolls carried thereby so as to automatically disengage the clutch and halt movement of the chain when a set of rolls arrives at a position convenient for the operator to manipulate the stock. The arrangement of the clutch operating mechanism is such that on completion of the application of one ply of fabric to the carcass former, the next ply to be incorporated may be brought to a convenient position by merely re-establishing the chain drive, allowing the automatic stop mechanism to break the drive when the next supply and liner rolls are within convenient reach. A manually operable lever is provided to shift the liner roll, which is sustained by the hangers below the supply roll, into contact with the rear of the carcass former in order to establish a friction drive for the pair of rolls. The liner strip, which is interposed between the convolutions of the stock, is thus reeled onto the liner roll and the stock uncoiled without tension and at the velocity of the carcass former's periphery on which the operative disposes it.

The invention is illustrated in the accompanying drawings, in which—

Figs. 1 and 2 are side and front elevations of the stock roll magazine;

Fig. 3 is an elevation of the stock roll magazine, partly in section, from the side opposite that shown in Fig. 1 and shows the magazine in operative position in rear of the carcass former.

Fig. 4 is an elevation of the carcass former and its driving mechanism, the frame or housing of the latter appearing in vertical section.

Figure 5:
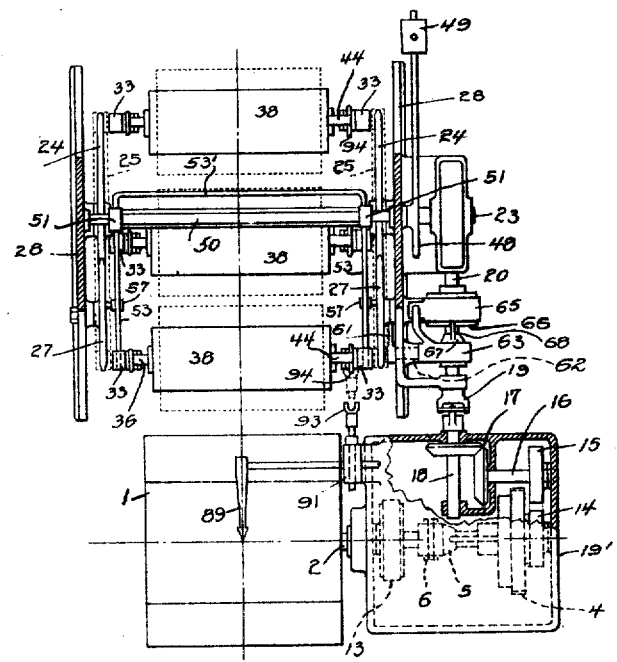
Fig. 5 is a top plan view of the associated stock roll magazine and carcass former, parts being sectioned or broken away to more clearly illustrate the drive for one of the sprockets supporting the chains of the stock roll magazine.
Figure 6:
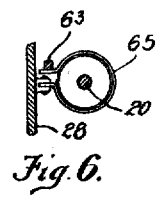

As shown best in the side elevation and in the plan view of Fig. 5, the stock roll magazine is located immediately in rear of the carcass former.

The carcass former illustrated in the drawings is of the collapsible drum type indicated at 1, being mounted on a main shaft 2 which may be driven in any suitable manner as from a motor 3 through a belt or chain 4 and clutch 5 which is coupled or uncoupled from the source of power by shifting an arm 6 of a lever fulcrumed at 7 and having two other arms 8 and 9 which are linked to treadles 10 and 11 respectively, the arm 8 being also pinned at 12 to a band brake 13. The arrangement of the clutch operating mechanism is such that depression of the treadle 10 throws the clutch out and the brake on, and incidentally raises the treadle 11, thus stopping rotation of the drum 1. By depressing the treadle 11 the clutch is thrown in, the brake off, and the treadle 10 up, thus rotating the drum 1.

At the right end of the main shaft 2 is a pulley or sprocket 14 which is adapted to drive a similar pulley or sprocket 15 on a shaft 16, see Fig. 5, which is connected by bevel gears 17 to a shaft 18 journaled in the frame 19' at substantially right angles to the main shaft 2. Through a coupling 19, shaft 18 is adapted to drive a co-axial shaft 20 at whose opposite end is a worm 21 in engagement with a worm wheel 22 on a shaft 23 carrying a pair of spaced and parallel sprockets 24 for driving chains 25 which constitute a flexible endless carrier for the supply stock. The chains pass around the sprockets 24 and around pairs of sprockets 26 and 27 whose supporting shafts are suitably journaled in the side members 28 of an upright frame the base 29 of which is adapted to rest on the same floor or foundation as the frame 19 of the carcass forming machine. The side members 28 of the frame are suitably braced by spacing tie bolts 30, and in its upper part each member is provided with an adjustable pillow block 31 for taking up slack in the chains 25.

Figure 7:
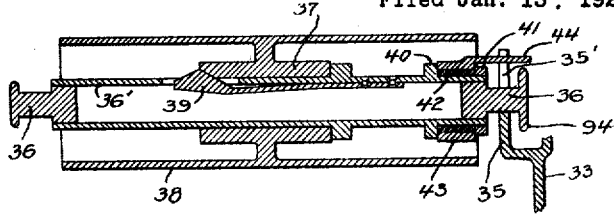
Figs. 6 and 7 are details of a brake for the chain drive and one of the stock rolls respectively, the latter appearing in longitudinal section.
Figures 8, 9, 10, 11:
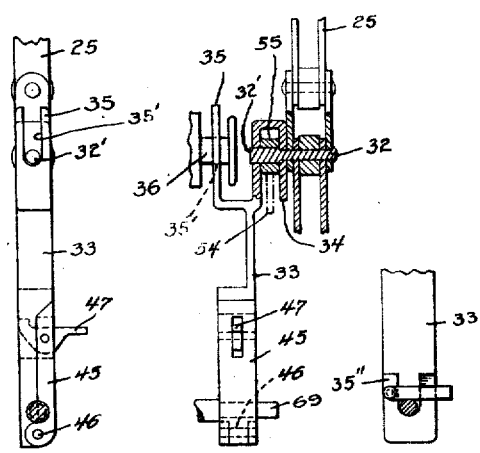
Figs. 8 and 9 are front and side views of a preferred form of hanger for supporting a pair of stock rolls showing in section on the former the construction of its hinge or pivot.
Figs. 10 and 11 are similar views of the lower end of a modified form of hanger.

A series of pairs or sets of stock and liner rolls are supported by the chains 25. At suitable intervals, the pins 32 connecting the links of the parallel chains, see Figs. 8 and 9, are formed with inwardly extending lugs 32' which afford supports for hangers 33. A pair of these hangers 33 are hinged opposite one another. Each hanger is provided at its upper extremity with a downwardly bent portion 34 which is apertured to receive the pin 32 and with an upwardly bent portion 35 which is provided with a U-shaped slot 35' for the reception of the spindle 36 of a roll. The spindle 36 is preferably but not necessarily formed in two parts, the tubular portion 36', Fig. 7, being adapted to sustain the hub 37 of a hollow cylinder or spool 38. The cylinder or spool 38 may be secured to the spindle in any suitable manner, preferably as shown, by a combined latch and key 39 which is connected to the tube 36', but may be sprung inwardly to permit removal of the spool or cylinder. Between collars 40 and 41 on the spindle 36 friction material 42 such as leather or rubber is confined and a split and adjustable sleeve 43 embracing the same is provided with a laterally extending finger 44 entering the U-shaped slot 35' of the hanger. By suitable constriction of the collar 43 "coasting" or too free running of the cylinder or spool holder 38 may be prevented.

Each of the hangers 33 at its lower extremity is adapted to carry a second roll with its axis parallel to the first and at a substantially fixed distance therefrom. The cylinder and spindle of the lower rolls are preferably constructed like the upper roll. Their spindles may be latched in a U-shaped slot in a bent end 35'' of the hanger, as shown in Figs. 10 and 11, or the lower end of each hanger may be cut away to receive an arm 45 which is hinged at 46 and has pivoted to it a latch 47 adapted to hold the arm 45 in position and to permit it to be moved out of the way for removal of a loaded liner roll and substitution of an empty spool at needed times.

When an operator has applied a ply of stock and cut it off from a great length thereof coiled about a supply roll, a new and usually wider stock, or in the case of cord tires one whose cords are oppositely inclined, must be advanced to a convenient position within the operator's reach. It is desirable that this presentation of the next stock ply may be accomplished with little manual effort and attention, and also quickly. For this purpose the worm drive shaft 20 which operates the sprockets 24 is equipped with a clutch and band brake which may be operated manually to start movement of the chains or carrier and automatically to stop movement thereof. A starting hand lever 48, see Fig. 3, weighted as indicated at 49 and fulcrumed as indicated at 50 has a crank arm 51 which is loosely pinned at 52 to one end of a lever 53 whose other end indicated at 54 is normally held by the action of weight 49 in the path of blocks 55, one on each of the series of lugs 32' which support the hangers 33. Intermediately the lever 53 is fulcrumed as indicated at 56 to the upper bent end of a vertically arranged rod 57 which is yieldingly supported by a coil spring 58 and a fixed abutment or lug 59. There is a lever 53 adjacent each chain connected together by a cross bar 53' and, having no fixed fulcra, they may be termed a floating member or lever. Intermediately, one of the rods 57 is loosely connected as indicated at 60 to an arm 61 fixed to a shaft 62, Fig. 1, having two other fixed arms 63 and 64, Fig. 1, which operate the band brake 65 and the driven member 66 of a clutch, respectively, the latter (clutch member) through a conical ended shift collar 67 and toggles 68. When the starting hand lever 48 is depressed the end 54 of the lever or strip 53 is withdrawn from the path of a block 55, permitting spring 58 to raise rod 57, lever 53 and arm 61. Through the latter, arm 61, the clutch (whose driven member is indicated at 66) is engaged and the brake 65 relieved, whereupon the sprockets 24 move the chains or carrier. When the operator takes his hand off the starting lever 48, weight 49 returns the strip 54 to a position in the path of the next block 55. The succeeding pair of rolls on arrival at the predetermined desired position thrust the rod 57 downward against the action of spring 58 and a resulting turning of the lever arm 61 operates the arm 63 and 64 on the fulcrum shaft 62 to disengage the clutch and apply the brake.

Means are provided to feed the stock to the operator without tension or distortion and at a rate substantially equal the peripheral velocity of the carcass former which of course increases as the plies of stock accumulate, the carcass former being driven usually at a constant angular velocity. The pair of stock rolls on their hangers 33 having been brought to a convenient position such as shown in Fig. 3 of the drawings, the above mentioned result is accomplished by swinging the hangers 33 about their hinged support 32' so as to carry the lower or liner roll into engagement with the carcass former or building drum. Outwardly extending lugs 69 on the hangers 33 are adapted to enter channeled members formed by oppositely curved flanges 70 on the upper ends of two levers 71, each of which is fulcrumed on a rod 72 and urged in a clockwise direction as viewed in Fig. 3 by a tension spring 73 connected to it at 74. The liner-roll-shifting-lever 71 is adapted to be moved from the dotted to the solid line positions shown in Fig. 3 by a treadle 75 fulcrumed at 76 and having its upright arm 76' linked as indicated at 77 to the lever 71. A latch 78 is loosely pinned to a long lug 79 and its undercut end 80 is adapted to engage the extremity of the treadle arm 76' when the liner-roll-shifting-lever 71 has been moved to the position shown in solid lines in Fig. 3. In this solid line position the lugs 69 on the hangers 33 are adapted to be moved out of the channel formed by the flanges 70 which in the ensuing step-at-a-time movement of the chains 25 is entered by the lugs 69 on the next pair of hangers 33 and thus automatically establish operative connection with the shifting lever 71. A new pair of supply rolls having been moved to the position shown in Fig 3, the latch 78 is disengaged by upward movement of a pin 82 against the action of its retracting spring 83 which reacts against the lug 84 integral with the treadle arm 76'. The pin or plunger 82 is moved upwardly through a small bell crank lever 85 pivoted on the treadle arm 76' as indicated at 86 and linked as indicated at 87 to an auxiliary treadle 88 which is fulcrumed on the accessible end of the treadle as shown. By depressing the front end of this auxiliary treadle, the pin or plunger 82 is positively lifted, and the main treadle 75, which has been held depressed, is thus freed so that the link 77 no longer prevents movement of the liner roll lifting lever 71 in a direction carrying its upper end towards the carcass former or building drum which automatically ensues through the action of the spring 73, the accessible treadle end moving up.

The upper rolls on the hangers 33 have the stock coiled thereabout with a ply of bare fabric interposed between contiguous convolutions for the purpose of preventing their adherence to one another. The coiling of these stock and liner plies is not usually done with precision. And it is necessary to ply the stock up in forming the carcass so that the center line of each ply coincides with the one previously applied. Usually the plies of stock have a line lightly scratched or marked in their center. A counterbalanced pointer 89 is hinged at 90 to a bracket 91 to guide the operator. And the bracket 91 is preferably provided with a crank 92 on the rear end of which is a bifurcated arm 93 which is adapted to engage the opposite sides of a flange 94 formed on the spindles 36 of the rolls. A coil spring 95 normally holds the crank in a disengaged position as shown in solid lines in Fig. 5. By pushing on the crank 92 the flange 94 on a spindle 36 may be engaged and the roll shifted to the right or left to maintain the center line of the ply being manipulated under the pointer 89.

The operation of the machine will be obvious from what has already been stated, and no further explanation is thought necessary. It is noted, however, that the starting hand lever 48 which governs the drive for the chains 25 may be held depressed and one or more pairs of the stock rolls moved past the tire building drum without being stopped. This feature enables any one exhausted supply roll to be quickly brought to an accessible position for removal and replacement with a loaded spool.

While the foregoing relates to the preferred embodiment of the invention it will be obvious that many changes may be made without departure from the underlying principles thereof. The direct friction drive of the liner rolls is preferable, but clearly the same end may be accomplished indirectly by interposed rollers geared or otherwise connected to the liner reel. To drive both the tire building machine or carcass former and the endless flexible carrier from a common source of power is desirable but independent motors or belt drives may be utilized to actuate the carcass former and the endless flexible carrier or chain. While it is preferred to support the liner reels on hangers with the supply rolls, it is within the broad principle of the present invention to mount the liner reel directly on the chains and move the latter through a species of slack take-up mechanism so as to bring the liner reel into frictional driving relation with the carcass former or tire building drum. While it is preferred to arrange the chains with relatively close and parallel vertical flights as such arrangement economizes floor space, where such economy is not necessary it will be obvious that the sprockets, which support and actuate the chains constituting the carrier, may be variously disposed to cause the chains to travel in variously shaped paths but preferably with at least one flight thereof contiguous the carcass former.

Having thus described my invention, what I claim and desire to protect by Letters Patent is:

1. Apparatus for supplying stock to tire building machines including in combination, means for carrying a plurality of rolls, means for moving the said means by power, and means operated automatically by the first mentioned means for disconnecting the power drive and stopping movement of the same when the rolls arrive successively at a predetermined position.

2. Apparatus for supplying stock to tire building machines including in combination, means for carrying a plurality of rolls, means for moving the said means by power, means operated automatically by the first mentioned means for stopping movement of the same when the rolls arrive successively at a predetermined position, said last named means including a floating lever, a clutch, and clutch operating connections governed by movement of the floating lever.

3. Apparatus for supplying stock to tire building machines including in combination, endless chains, sprockets for supporting and actuating said chains in spaced parallelism, means on said chains for supporting rolls, manually operable means for coupling at least one of the sprockets to a source of power and moving the chains, and means for arresting movement of the chains including a trip co-acting with the chain when a roll arrives at a predetermined position.

4. Apparatus for supplying stock to tire building machines including in combination, endless chains, sprockets for supporting and actuating said chains in spaced parallelism, means on said chains for supporting rolls, manually operable means for coupling at least one of the sprockets to a source of power and moving the chain, said last named means including a trip co-acting with the chain, a clutch, a brake, and connections between the trip and the clutch and brake whereby the power drive of the chain may be discontinued and its movement halted.

5. Apparatus for supplying stock to tire builders including in combination, an endless flexible carrier and a plurality of roll supports hinged to said carrier, each of said supports being shaped to sustain a plurality of rolls a fixed distance apart.

6. Apparatus for supplying stock to tire builders including a carrier, a plurality of devices hinged to said carrier and provided with means to sustain a plurality of rolls, in combination with a circular and revoluble carcass former, and means for rotating from the revoluble carcass former one of the rolls on a hinged device whereby the other roll thereon may be uncoiled and stocks applied to the builder without stretching it.

7. Apparatus for supplying stock to tire builders including a carrier, a plurality of devices hinged to said carrier and provided with means to sustain a plurality of rolls, in combination with a circular and revoluble carcass former, and means for moving a roll supported by said device into direct engagement with the revoluble carcass former for rotation thereby.

8. Apparatus for supplying stock to tire builders including an endless flexible carrier arranged substantially upright and carrying a plurality of rolls, in combination with an annular carcass former in proximity thereto, and means for establishing a friction drive of any pair of said rolls by said carcass former.

9. Apparatus for supplying stock to tire builders including in combination, a revoluble carcass former, means for carrying a plurality of supply and liner rolls associated in pairs, means for moving a pair of the rolls to a position adjacent the carcass former, and means for driving any one of the pairs of rolls by traction of one of them against the carcass former while located in proximity thereto.

10. Apparatus for supplying stock to tire builders including in combination, a circular carcass former, means for rotating the same, a flexible endless carrier adjacent the carcass former, and means for moving it, members movably sustained by said carrier for supporting a series of pairs of supply and liner rolls, and means for moving the members to establish a frictional driving relation between one of the rolls and a carcass former.

11. Apparatus for supplying stock to tire builders including in combination, a circular carcass former, means for rotating the same, a flexible endless carrier adjacent the carcass former and means for moving it, members movably sustained by said carrier for supporting a series of pairs of supply and liner rolls, and means for moving the members to establish a frictional driving relation between one of the rolls and a carcass former, said last named means including a device with which the roll supporting members automatically establish operative connection.

12. Apparatus for supplying stock to tire builders including in combination, a circular carcass former, means for rotating the same, a flexible endless carrier adjacent the carcass former and means for moving it, members movably sustained by said carrier for supporting a series of pairs of supply and liner rolls, and means for moving the members to establish a frictional driving relation between one of the rolls and a carcass former, said last named means including a channeled device, and lugs projecting from said members adapted to engage and disengage themselves with and from the channeled device.

13. Apparatus for supplying stock to tire builders including in combination, a circular carcass former, means for rotating the same, a flexible endless carrier adjacent the carcass former and means for moving it, members movably sustained by said carrier for supporting pairs of supply and liner rolls, means for moving the members to establish a frictional driving relation between one of the rolls and a carcass former, said last named means including a device with which the roll supporting members automatically establish operative connection, and a manually operable lever carrying said device.

14. Apparatus for supplying stock to tire builders including in combination, a circular carcass former, means for rotating the same, a flexible endless carrier adjacent the carcass former and means for moving it, members movably sustained by said carrier for supporting pairs of supply and liner rolls, means for moving the members to establish a frictional driving relation between one of the rolls and a carcass former, said last named means including a device with which the roll supporting members automatically establish operative connection, a manually operable lever carrying said device, a spring yieldingly urging said lever toward the carcass former, and a latch for holding said lever away from the carcass former and in a position where the device may be operatively connected with the member.

15. Tire stock supplying apparatus including in combination an endless flexible carrier, hangers hinged to said carrier for supporting stock and liner rolls in pairs a substantially fixed distance apart, means for moving and stopping said carrier to bring the pairs of rolls successively to a predetermined position, and means for rotating one of said rolls to reel up a liner strip and uncoil the stock from the other roll without subjecting it to tension.

16. Tire stock supplying apparatus including in combination an endless flexible carrier, hangers hinged to said carrier for supporting stock and liner rolls in pairs a substantially fixed distance apart, means for moving and stopping said carrier to bring the pairs of rolls successively to a predetermined position, and means for rotating one of said rolls to reel up a liner strip and uncoil the stock from the other roll without subjecting it to tension, said hangers being constructed to demountably support the rolls.

17. Tire stock supplying apparatus including in combination an endless flexible carrier, hangers hinged to said carrier for supporting stock and liner rolls in pairs a substantially fixed distance apart, means for moving and stopping said carrier to bring the pairs of rolls successively to a predetermined position, means for rotating one of said rolls to reel up a liner strip and uncoil the stock from the other roll without subjecting it to tension, and means for axially shifting rolls supported by the hangers to permit uncoiling the stock in a definite path.

18. Tire stock supplying apparatus including in combination an endless flexible carrier consisting of a plurality of chains, sprockets for supporting and moving said chains, hangers hinged on said chains opposite one another in pairs, stock and liner rolls supported horizontally between the pairs of hangers, means for driving at least one of said sprockets, and means for stopping the sprocket drive when the next succeeding pair of rolls reach a predetermined position.

19. Tire stock supplying apparatus including in combination an endless flexible carrier consisting of a plurality of chains, sprockets for supporting and moving said chains, hangers hinged on said chains opposite one another in pairs, stock and liner rolls supported horizontally between the pairs of hangers, means for driving at least one of said sprockets, and means operated automatically by the arrival of the next pair of rolls at a predetermined position to disengage the sprocket drive.

20. Apparatus for supplying stock to tire builders including in combination, a carrier, a plurality of pairs of hangers hinged to said carrier, and supply and liner rolls on each pair of said hangers, said rolls being shiftable axially.

21. Apparatus for supplying stock to tire builders including in combination, a carrier, a plurality of pairs of hangers hinged to said carrier, supply and liner rolls on each pair of said hangers, and means for preventing too free rotation of the supply rolls.

22. Apparatus for supplying stock to tire builders including in combination, a carrier, a plurality of pairs of hangers hinged to said carrier, supply and liner rolls on each pair of said hangers, and means cooperating with the hangers and frictionally opposing rotation of the supply rolls.

23. A stock roll magazine having in combination, a carrier composed of spaced endless chains, hangers hinged thereto opposite one another in pairs, rolls demountably supported by said hangers, each of said rolls having a spindle shiftable endwise and transversely of the hangers, and a spool or shell removably sustained by the spindle.

Signed at Detroit, county of Wayne, State of Michigan, this 31st day of December, 1920.

ADRIAN O. ABBOTT, Jr.
CLYDE J. SMITH.